United States Patent [19]

Hofstadt et al.

[11] 3,901,826
[45] Aug. 26, 1975

[54] ACID TREATED, THREE-SHEET MINERAL ABSORBENTS AND METHOD FOR PREPARING SAME

[75] Inventors: Carl-Ernst Hofstadt, Munich; Rudolf Fahn, Gammelsdorf; Anton Wirzmuller, Moosburg, all of Germany

[73] Assignee: Sud-Chemie AG, Munich, Germany

[22] Filed: Sept. 25, 1973

[21] Appl. No.: 400,596

[30] Foreign Application Priority Data
Sept. 28, 1972 Germany............................ 2247530

[52] U.S. Cl................ 252/450; 252/455 Z; 99/48
[51] Int. Cl..... B01j 11/32; B01j 11/58; B01j 11/60
[58] Field of Search........................ 252/450, 455 R

[56] References Cited
UNITED STATES PATENTS 3,148,158  9/1964  Schenck et al. .................... 252/450
3,557,023  1/1971  Raible............................... 252/450

FOREIGN PATENTS OR APPLICATIONS 939,938  10/1963  United Kingdom................. 252/450

*Primary Examiner*—Carl F. Dees
*Attorney, Agent, or Firm*—Burgess, Dinklage & Sprung

[57] ABSTRACT

Three-sheet minerals such as montmorillonite and montmorillonite based clays are acid treated to produce adsorbents having a silica content of at least 80 percent by weight and a crystal lattice structure that is substantially X-ray amorphous due to removal of the octahedral sheet that is predominantly built up of iron and aluminum ions.

4 Claims, No Drawings

ACID TREATED, THREE-SHEET MINERAL ABSORBENTS AND METHOD FOR PREPARING SAME

BACKGROUND

This invention relates to adsorbents prepared by acid treating three-sheet minerals such as montmorillonite and montmorillonite based clays. The invention also relates to a process for producing such adsorbents which are characterized as substantially x-ray amorphous due to removal of the octahedral sheet which exists in minerals of this type between two tetrahedral sheets of silicon and oxygen.

It is known that adsorbents having a high activity may be obtained by the treatment of certain clay minerals, especially three-sheet minerals, with acids. Products of this type are obtained in a large scale from montmorillonite, hectorite or other three-sheet minerals; they are known under the term "bleaching earths." They have found acceptance as economical adsorbents for the purification of organic liquids, such as solvents, fatty oils, mineral oils, and neutral aqueous solutions.

The usual commercial bleaching earths cannot be used in the field of the weakly acid aqueous solutions, especially with fruit juices, beer, wine, and other fermented beverages. The reason is because bleaching earth, when contacted with acid aqueous solutions, will release iron and aluminum ions. This will be increased if the aqueous solution, in addition to having a low pH, contains a substantial amount of complex-forming ions or compounds, e.g. polyvalent organic or inorganic acids. In such cases, about 500 to 700 mg iron and about twice this amount of aluminum is leached from 100 g bleaching earth. While it is true that these amounts are extremely low in relation to the liquids treated, it is known, however, that iron and aluminum may have a catalytic effect and may accelerate oxidation reactions which are a very serious problem especially in the brewing industry.

In three-sheet minerals and in bleaching earths produced therefrom, the elements iron and aluminum are bonded in three different forms which differ with respect to their solubility in acids. (See Kirk-Othmer, *Encyclopedia of Chemical Technology*, 2nd Ed., Vol. 3, p. 339 et seq., Interscience Publishers a division of John Wiley & Sons, Inc., New York, London, Sydney, which is incorporated herein by reference.)

The main amounts of iron and aluminum, which may vary between about 2 and 20 percent by weight for each element depending upon the origin of the mineral and the manufacturing procedure, is present within the regions of the crystal lattice of the three-sheet silicate which are not destroyed during the decomposition of the mineral with acids. This type of iron and aluminum can be extracted relatively quickly by means of a moderately concentrated hot mineral acid (e.g. 10–20% HCl); it can be extracted slowly, but still noticeably by means of dilute, cold mineral acid (pH 1 to 2).

A second smaller amount of iron and aluminum is released only during the conventional manufacturing process, i.e., by deposition of the respective hydroxides from the process liquids. This hydroxide precipitation will occur as soon as the acid-treated clay whose pores are still filled with the relatively concentrated metal salt solution resulting from the reaction, is washed with water. If the $H+$ ions, which have a greater mobility, have been leached out to such extent that there is a pH of 3 to 4, the iron and aluminum ions which are not yet leached out and are mainly present in the liquid within the pores, will hydrolyze to form the corresponding hydroxides, and these hydroxides will form a precipitate on the internal surfaces of the adsorbent which is invisible in most cases.

These hydroxides are very easily soluble, even in cold, weak organic acids. They contain about 400 to 600 mg iron and corresponding amount of aluminum per 100 g bleaching earth which is the main proportion of the above-mentioned metal ions that create problems in the beverage industry.

The last amount of soluble iron and aluminum is formed in the conventional process, also during the washing step, within the bleaching earth filter cake as hydroxide precipitate. This precipitate is formed only on the surface of the filter cake, i.e., at the inlet side of the washing water, in the form of a yellow to tan soft layer that can be recognized with the naked eye. The reason for this phenomenon is the capability of the bleaching earths to absorptively bond colloidal iron and aluminum hydroxides at suitable pH values. This proportion of iron or aluminum is also very easily soluble. With bleaching earths it amounts to approximately 100 to 200 mg iron or aluminum per 100 g.

Methods are known by which bleaching earths can be washed out completely with acidified water having a pH of about 3. This avoids the formation of hydroxide precipitates during the manufacture. However, these methods have the disadvantage that the final adsorbent shows a strong acid reaction. Moreover, the $H+$ ions of the acidified washing water further attack the crystal lattice of the clay, and slowly, but continuously dissolve new iron and aluminum ions from the lattice, whereby water-soluble salts are formed again.

According to the disclosure of published German patent application No. 1,642,767, the deposition of hydroxides during the washing step is prevented by adding complex-forming additives to the washing water. This enables the exchange of the originally acid water within the pores that contains iron and aluminum. However, the relatively high concentration of complex-forming agents, e.g., polyphosphates, makes it necessary to rinse even for an extended period and with a larger amount of washing water, in order to remove these additives. This will result in an increased formation of the above-mentioned surface hydroxide layer. It is possible, however, to obtain iron and aluminum concentrations of less than approximately 140 mg/100 g. This partial success, however, is offset by the high costs for the chemicals, and requires costly efforts for the removal of the waste waters containing the chemicals.

SUMMARY

It is an object of the present invention to provide adsorbents consisting of acid treated three-sheet minerals, especially of montmorillonite and montmorillonite-based clays, and to provide a method for the economical manufacture of such adsorbents which are suitable for the treatment of aqueous acid solutions, especially of beverages, and which do not release objectionable amounts of iron and aluminum ions.

The invention is based on the discovery that acid-treated three-sheet minerals still show excellent adsorptive properties in aqueous solutions if the octahedral sheet of the crystal lattice which is predominantly built up of aluminum and iron ions has been dissolved out of the lattice to a large or substantial extent. The original crystal lattice will become X-ray amorphous by dissolving out the octahedral sheet.

Thus, the invention relates to adsorbents consisting of acid-treated three-sheet minerals having a $SiO_2$-content of at least 80 percent by weight and a crystal lattice that has become X-ray amorphous due to the removal of the octahedral sheet which is predominantly built up of iron and aluminum ions.

DESCRIPTION

Three-sheet minerals in the sense of the present invention are especially minerals of the montmorine group, especially montmorillonite, beidellite and nontronite clays (also known as bentonites), and hectorite clays. The naturally occurring bentonites are classified as sodium and calcium bentonites. The discovery on which the present invention is based, is quite surprising in that selective adsorption capacity with organic liquids is usually found only if there are present together simultaneously a large internal surface and crystaline layer lattice regions (e.g., the octahedral sheet) that can be detected by X-ray analysis.

The X-ray amorphous phase of the adsorbents according to the present invention has the unexpected property of not causing deposits of aluminum and iron hydroxides by adsorption from the washing water.

The present invention also relates to a method of preparing the above-mentioned adsorbents. This method involves treating three-sheet minerals (e.g., bentonite) with mineral acid (e.g. hydrochloric acid or sulfuric acid) until a $SiO_2$-content of at least about 80 percent by weight based on the dry final product) is obtained, and until the original crystal lattice has become largely X-ray amorphous due to the removal of the octahedral sheet that is predominantly built up of iron and aluminum ions. Thereafter, the acid treatment solution is separated from the resulting solid product in a manner know per se.

The acid treatment is preferably carried out using an approximately 5 to 20 percent hydrochloric acid or a 10 to 40 percent sulfuric acid at temperatures of from 90° to 150°C under a pressure of from 0 to 5 atmospheres gauge and over a period of from 1 to 24 hours. After the acid treatment, the acid treatment solution is separated from the solid product, e.g., by decantation, filtration or centrifugation, and the solid product is washed with water, optionally acidified (e.g. with a pH of 2) for a sufficient period until the washing water is substantially free of ions. The filtered cake which is easily penetrated by water may then be optionally washed with tap water until the waste water has reached the desired pH, usually between 4 and 6.

The present invention will be illustrated further by the following example which is not intended to be limiting in any way.

EXAMPLE 5,000 kg of raw bentonite having a moisture content as received from the mine, i.e., approximately 40 percent water, was slurried with 7,000 liters water, and mixed with 5,000 liters of 31 percent hydrochloric acid. The mixture was heated at about 98°C and normal pressure over a period of approximately 12 hours. Thereafter, the $SiO_2$-content of the resulting product (based on the dry substance) was about 81 percent. The suspended solid material was separated by filitration from the acid treatment solution, and the filter cake was washed with approximately 10,000 liters water acidified with hydrochloric acid to a pH of 2, until no iron could be detected. The residual acid was removed by washing with tap water until a pH of about 4 had been reached. The product was subsequently dried; however, it can also be used as adsorbent in the moist state.

In comparison to an adsorbent that has been treated with acid in the usual manner ($SiO_2$-content 72%) or with an adsorbent that has been washed with a phosphate solution, the adsorbent obtained by the above-mentioned procedure contains the following amounts of soluble iron and aluminum (see note):

|    | Adsorbent treated in the usual manner mg/100 g | Adsorbent washed with phosphate mg/100 g | Adsorbent made according to the invention mg/100 g |
|----|-----|-----|-----|
| Fe | 340 | 161 | 26 |
| Al | 140 | 37  | 21 |

NOTE:
In order to determine the amounts of soluble iron and aluminum, 5 g of dry adsorbent is shaken with 50 ml citric acid-citrate-buffer according to SORENSEN (pH 4) in a shaking flask for 12 hours. After filtration, the dissolved iron and aluminum ions were determined colorimetrically or titrimetrically.

The invention permits the preparation of an adsorbent for aqueous acid media, which absorbent does not give off objectionable amounts of iron and aluminum ions, and that is especially economical because, besides hydrochloric acid, no additional chemicals have to be used. The type of the resulting waste waters which, when hydrochloric acid is used, contain only HCl and water-soluble chlorides, permits unobjectionable disposal by introducing them into lime-containing deep rock formations in a known manner, thus avoiding environmental pollution.

The product according to the invention has a stabilizing effect against protein which is comparable to that of adsorbents washed with phosphate.

What is claimed is:

1. Absorbent for the treatment of aqueous acid solutions, especially beverages, comprising three-sheet minerals having a $SiO_2$ content of at least 80% by weight and a crystal lattice that is substantially X-ray amorphous produced by treating three-sheet minerals with mineral acid until an $SiO_2$-content of at least 80 percent, based on the dry final product, is obtained and until the original crystal lattice has substantially become X-ray amorphous by the removal of the octahedral sheet that is predominantly built up of iron and aluminum ions and thereafter separating the acid treatment solution from the resulting adsorbent, said crystal lattice preventing the release of appreciable amounts of iron and aluminum ions into solution and preventing the adsorption of iron and aluminum hydroxide deposits from washing water.

2. Adsorbent of claim 1 wherein the acid treatment is carried out with hydrochloric acid or sulfuric acid.

3. Adsorbent of claim 1 wherein the acid treatment is carried out using an approximately 5 to 20 percent hydrochloric acid or an approximately 10 to 40 percent sulfuric acid, at temperatures of from about 90° to 150°C under pressures of from about 0 to 5 atmospheres gauge over a period of from about 1 to 24 hours.

4. Adsorbent of claim 1 wherein the acid treatment solution is separated from the solid product by decantation, filtration or centrifugation, and the solid product is washed with water optionally acidified until the washing water is substantially free of iron.

* * * * *